US00RE46644E

(19) United States
(12) Reissued Patent
Lee

(10) Patent Number: US RE46,644 E
(45) Date of Reissued Patent: Dec. 19, 2017

(54) RESERVED IMAGE TRANSMISSION SYSTEM AND METHOD

(75) Inventor: Jae Kyung Lee, Daegu (KR)

(73) Assignee: LG Electronics Inc., Seoul (KR)

(21) Appl. No.: 12/858,126

(22) Filed: Aug. 17, 2010

Related U.S. Patent Documents

Reissue of:
(64) Patent No.: 7,698,299
Issued: Apr. 13, 2010
Appl. No.: 11/006,573
Filed: Dec. 8, 2004

(30) Foreign Application Priority Data

Dec. 9, 2003 (KR) ..... 10-2003-0088877

(51) Int. Cl.
*G06F 17/00* (2006.01)
*H04N 7/16* (2011.01)
*H04N 21/81* (2011.01)
*H04N 21/262* (2011.01)
*H04N 21/431* (2011.01)

(52) U.S. Cl.
CPC ..... *H04N 7/163* (2013.01); *H04N 21/262* (2013.01); *H04N 21/4316* (2013.01); *H04N 21/8153* (2013.01)

(58) Field of Classification Search
CPC .. H04N 7/163; H04N 21/262; H04N 21/4316; H04N 21/8153
USPC ..... 725/32, 46, 134; 705/27; 707/631–635, 707/781–788
See application file for complete search history.

(56) References Cited

U.S. PATENT DOCUMENTS 4,777,531 A * 10/1988 Hakamada et al. ..... 348/565
4,890,168 A 12/1989 Inoue et al.
5,908,997 A 6/1999 Arnold et al.
6,577,812 B1 6/2003 Kikuchi et al.
6,847,969 B1 1/2005 Mathai et al.
2001/0047294 A1* 11/2001 Rothschild ..... 705/14
2002/0035566 A1* 3/2002 Rugg et al. ..... 707/100
2002/0052917 A1* 5/2002 Ihara et al. ..... G06Q 30/0284 709/203
2002/0138843 A1* 9/2002 Samaan et al. ..... 725/87
2002/0167522 A1* 11/2002 Miyazawa ..... 345/530
2002/0174439 A1 11/2002 Akiyama et al.
2003/0035412 A1* 2/2003 Wang et al. ..... 370/352
(Continued)

FOREIGN PATENT DOCUMENTS

CN 1389074 1/2003
CN 1389074 A 1/2003
(Continued)

OTHER PUBLICATIONS

First page of CN 1627821 dated Oct. 13, 2010.
(Continued)

*Primary Examiner* — Luke S. Wassum
(74) *Attorney, Agent, or Firm* — KED & Associates LLP

(57) ABSTRACT

An image transmission system for reserving and transmitting an image to be broadcast is provided. The image transmission system includes: an uploading unit for inputting reservation request information for reservation of image transmission and uploading an image; and a server for storing the reservation request information and the image and transmitting the image to one or more recipients' display devices according to the reservation request information.

21 Claims, 4 Drawing Sheets

(56) References Cited

U.S. PATENT DOCUMENTS

| | | | | |
|---|---|---|---|---|
| 2003/0037147 | A1* | 2/2003 | Matsubayashi et al. | 209/227 |
| 2003/0040962 | A1* | 2/2003 | Lewis | 705/14 |
| 2003/0093792 | A1 | 5/2003 | Labeeb et al. | |
| 2003/0211856 | A1* | 11/2003 | Zilliacus | 455/466 |
| 2003/0229549 | A1* | 12/2003 | Wolinsky | G06Q 30/0248 705/14.61 |
| 2003/0237005 | A1* | 12/2003 | Bar-Or et al. | 713/201 |
| 2004/0010592 | A1* | 1/2004 | Carver et al. | 709/226 |
| 2004/0015445 | A1* | 1/2004 | Heaven et al. | 705/51 |
| 2004/0068750 | A1 | 4/2004 | Maa | |
| 2004/0078484 | A1* | 4/2004 | Parry et al. | 709/242 |
| 2004/0139318 | A1* | 7/2004 | Fiala et al. | 713/165 |
| 2004/0172451 | A1* | 9/2004 | Biggs et al. | 709/206 |
| 2004/0263314 | A1* | 12/2004 | Dorai et al. | G06F 21/32 340/5.2 |
| 2005/0015796 | A1* | 1/2005 | Bruckner et al. | 725/32 |
| 2005/0033806 | A1* | 2/2005 | Harvey et al. | H04L 12/1813 709/204 |
| 2005/0043019 | A1 | 2/2005 | Nakamura et al. | |
| 2005/0050577 | A1* | 3/2005 | Westbrook et al. | 725/134 |
| 2005/0102375 | A1* | 5/2005 | Varghese | 709/219 |
| 2006/0010470 | A1* | 1/2006 | Kurosaki et al. | 725/46 |
| 2006/0115238 | A1* | 6/2006 | Sako et al. | 386/94 |
| 2007/0218873 | A1* | 9/2007 | Taheri Oskouei | H04N 7/17318 455/410 |

FOREIGN PATENT DOCUMENTS

| | | | |
|---|---|---|---|
| CN | 1443418 | A | 9/2003 |
| CN | 1445976 | A | 10/2003 |
| EP | 1 257 109 | A2 | 11/2002 |
| WO | WO 00/52587 | | 9/2000 |
| WO | WO 01/10128 | A1 | 2/2001 |

OTHER PUBLICATIONS

Office Action dated Mar. 5, 2013 for U.S. Appl. No. 12/876,913.
Office Action dated Oct. 22, 2013, for co-pending U.S. Appl. No. 12/876,913.
U.S. Office Action for U.S. Appl. No. 12/876,913 dated Jun. 21, 2013.
Chinese Office Action dated Jul. 25, 2008.

* cited by examiner

RESERVED IMAGE TRANSMISSION SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of the Korean Application No. P2003-88877 filed on Dec. 9, 2003, which is hereby incorporated by reference.

*More than one reissue application has been filed for the reissue of U.S. Pat. No. 7,698,299. The Reissue Application numbers are Ser. No. 12/858,126 (present application) and Ser. No. 12/876,913, which is a Continuation Application of Ser. No. 12/858,126.*

BACKGROUND OF THE INVENTION

1. Field of the Invention

The present invention relates to an image transmission system, and more particularly, to an image transmission system for reserving and transmitting an image to be broadcast.

2. Discussion of the Related Art

Devices such a digital camera and a camcorder have been widely used for photographing an image. Users photograph an image by using the devices, and then edit the photographed image or display the photographed image on a Web page at their desire. Recently, mobile terminals such as a portable phone and a personal digital assistant (PDA) are also used for photographing an image. A photographed image can be transmitted to other mobile terminals or personal computers (PC) through a wired/wireless communication network. However, a receiving user can not receive a photographed image from a transmitting user when he does not have a mobile terminal or a PC connected to a communication network.

SUMMARY OF THE INVENTION

Accordingly, the present invention is directed to a reserved image transmission system and method that substantially obviates one or more problems due to limitations and disadvantages of the related art.

An object of the present invention is to provide a reserved image transmission system and method adapted for transmitting a reserved image to a desired person on a broadcast wave and then displaying the resulting received image on the person's TV.

Another object of the present invention is to provide a reserved image transmission system and method adapted for transmitting a reserved image to a predetermined recipient at a reserved date and time.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image transmission system comprises: an uploading unit for inputting reservation request information for reservation of image transmission and uploading an image; and a server for storing the reservation request information and the image and transmitting the image to one or more recipients' display devices according to the reservation request information.

The reservation request information may include user information and recipient information, and the user information may include at least one of a user's name, address, phone number and e-mail address.

The recipient information may include at least one of an ID or IP address of the display device and the recipient's phone number and e-mail address.

The reservation request information may include at least one of a type of the image, a reserved transmission date and time, a display option, and a message to be displayed together with the image.

The server may transmit a message preannouncing the image transmission to at least one of the display device, an e-mail address and a mobile terminal of the recipient.

In another aspect of the present invention, an image transmission system comprises: an uploading unit for inputting reservation request information for reservation of image transmission and uploading a reserved image; a server for storing the reservation request information and the reserved image and outputting the reserved image according to the reservation request information; and a display unit for receiving the reserved image from the server and transmitting to the server a confirmation message for informing the server whether or not a recipient has watched the reserved image.

The display device may store the reserved image if the recipient does not watch the reserved image, and the server may receive the confirmation message from the display device and uploads the received confirmation message to the uploading unit.

In further another aspect of the present invention, an image transmission method include the steps of: inputting reservation request information to a server for reservation of image transmission; uploading an image to the server; and transmitting the uploaded image from the server to one or more recipients' display devices according to the reservation request information.

The image transmission method may further include the step of determining whether or not the uploaded image is suitable for broadcast.

In still another aspect of the present invention, an image transmission method includes the steps of: inputting reservation request information to a server through an uploading unit, for reserving image transmission; uploading a reserved image from the uploading unit to the server; transmitting the reserved image from the server to one or more display devices according to the reservation request information; and transmitting from the display device to the server a confirmation message for informing the server whether or not a recipient has watched the reserved image.

The image transmission method may further include the steps of: determining whether or not the recipient has watched the reserved image; and storing the reserved image if the recipient does not watch the reserved image transmitted to the display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
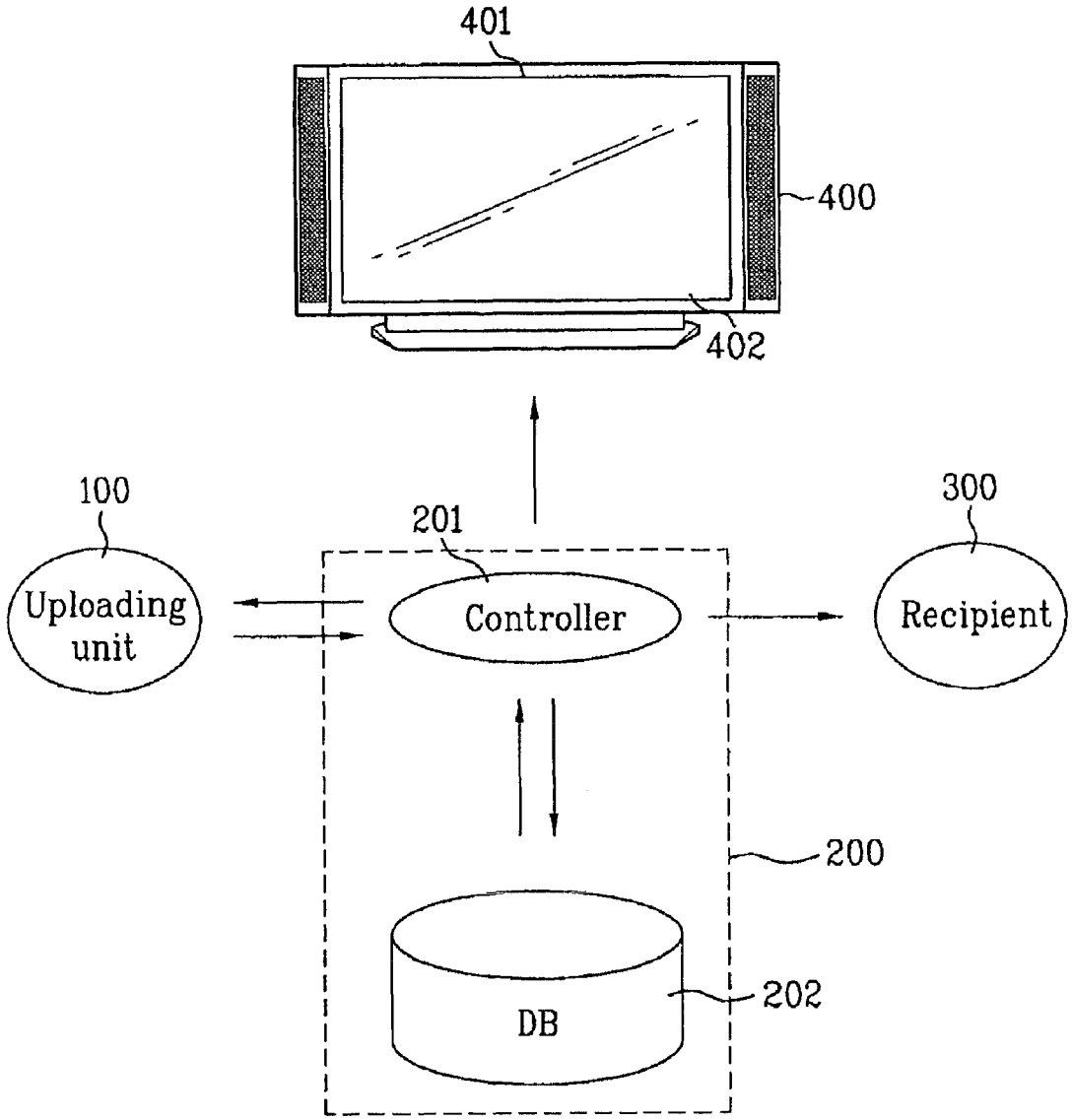
FIG. 1 is a block diagram of an image transmission system according to an embodiment of the present invention.

FIG. 1 is a block diagram of an image transmission system according to an embodiment of the present invention.

Referring to FIG. 1, the image transmission system is constructed to include a user's uploading unit 100, a broadcast station's server 200, and a recipient's display device 400. Here, examples of the recipient's display device 400 include a TV receiver. The uploading unit 100 transmits at least one of an image, a voice and a message, together with reservation request information, to the server 200. The reservation request information includes user information, recipient information, the type of an image to be uploaded, a reserved broadcast date and time, and display options, and so on. The user information includes the user's name, address, phone number and e-mail address, and the like. The recipient information includes the number of recipients, the recipients' names, addresses, phone numbers, e-mail addresses and display device identification (ID) or Internet protocol (IP) addresses, and so on. Also, the reservation request information may further include a message to be displayed together with the image. Examples of the uploading unit 100 include a mobile terminal, such as a portable phone and a PDA, a digital TV, a camcorder and a PC.

The server 200 stores the image, the voice and the reservation request information that are received from the uploading unit 100, and transmits the image, the voice and the message to the recipient's display device 400 according to the reservation request information. The server 200 is constructed to include a controller 201 for controlling input and output of various data, and a database (DB) 202 or a memory for storing the data.

Figure 2:
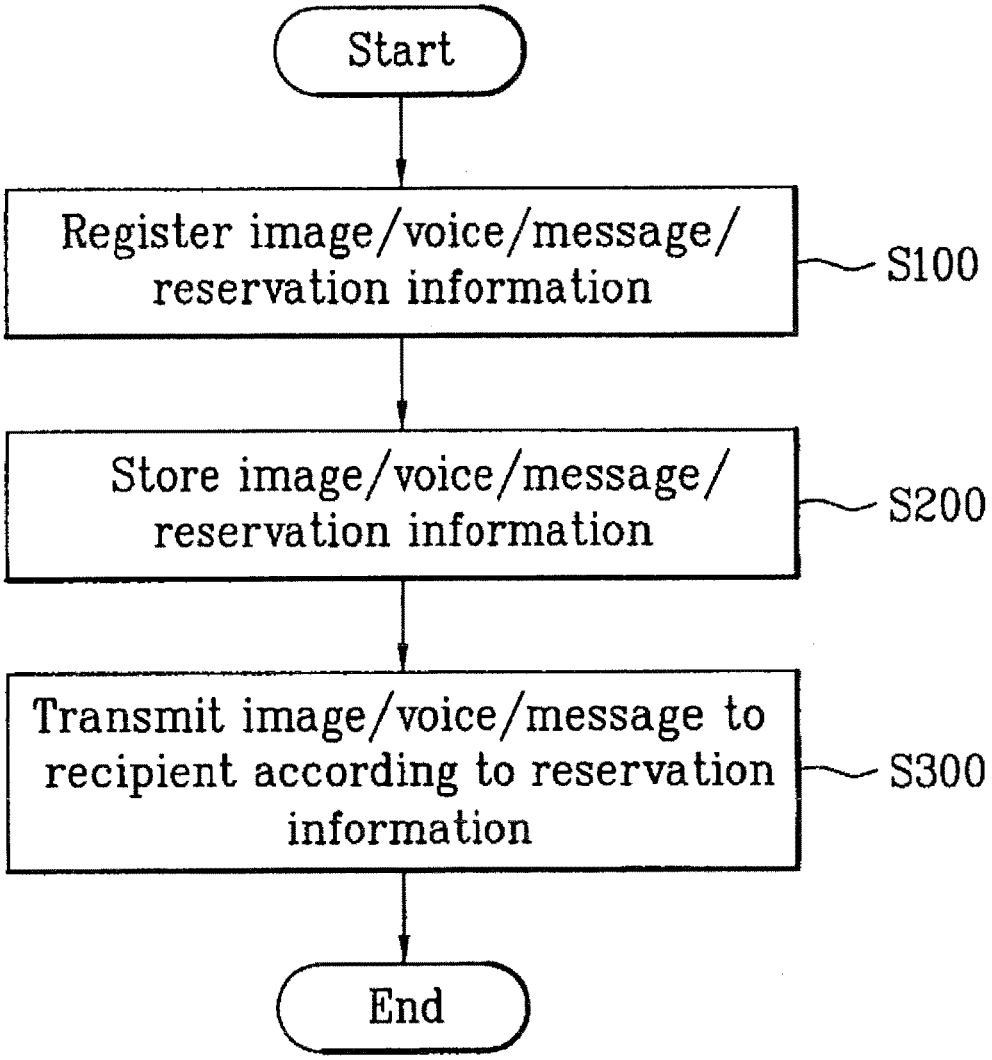
FIG. 2 is a flow diagram illustrating an image transmission method according to an embodiment of the present invention.

FIG. 2 is a flow diagram illustrating an image transmission method according to an embodiment of the present invention.

The image transmission method will now be described with reference to FIG. 2.

Referring to FIG. 2, the image transmission method is broadly classified into three steps. That is, the image transmission method is constructed to include the steps of: transmitting an image, a voice and a message, together with reservation request information, to the server 200 (S100); storing the image, the voice, the message and the reservation request information (S200); and transmitting the image, the voice and the message to a corresponding recipient according to the reservation request information (S300).

Figure 3:
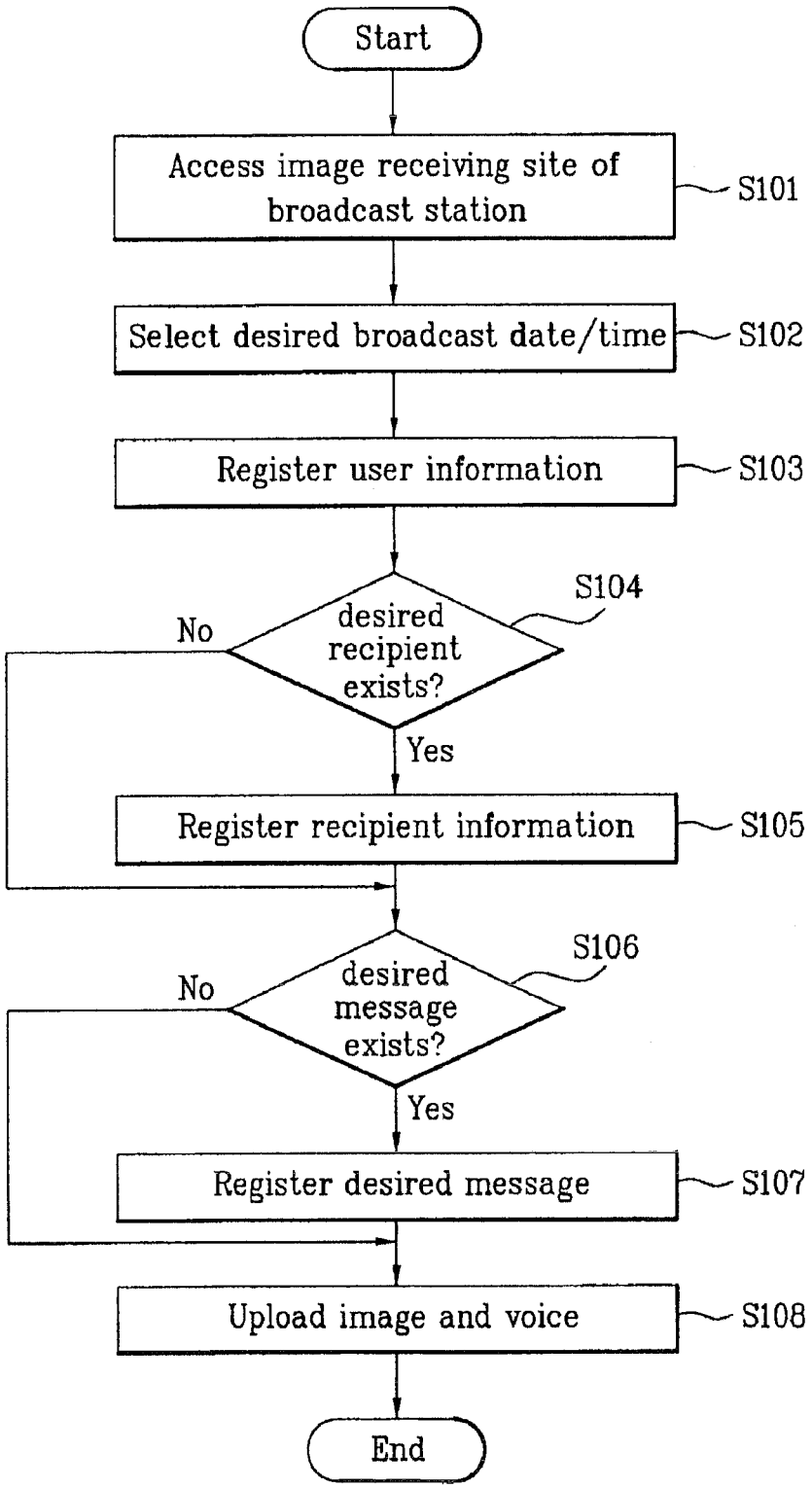
FIG. 3 is a flow diagram illustrating an image-reserving method according to an embodiment of the present invention.

FIG. 3 is a flow diagram illustrating a procedure for transmitting an image, a voice and message to the server 200.

The procedure for transmitting an image, a voice and message will now be described in detail with reference FIG. 3.

Referring to FIG. 3, when a user connects the uploading unit 100 to the server 200 through a communication network such as the Internet (S101), the server 200 provides a menu for registering or selecting reservation request information to the user. The user generates reservation request information by using the menu displayed on the uploading unit 100.

The user registers the type of image to be uploaded, a desired broadcast date and time, and display options by using the menu (S102). The image type represents whether the image is an MPEG (moving picture experts group) image or a digital video (DV) image. The user registers his user information (S103), and selects a recipient (S104). For example, the user registers the number of recipients, the recipients' name, address, phone number, e-mail addresses and display device ID or IP addresses (S105). Also, the user can register a message to be displayed together with the image, by using the menu (S106 and S107).

The server 200 determines whether to be able to transmit the image at the date and time reserved by the user, and transmits the determination results to the uploading unit 100. If transmission of the image can be reserved, the uploading unit 100 uploads the image and the voice to the server 200 (S108). The server then stores the reservation request information and the uploaded image and voice.

Figure 4:
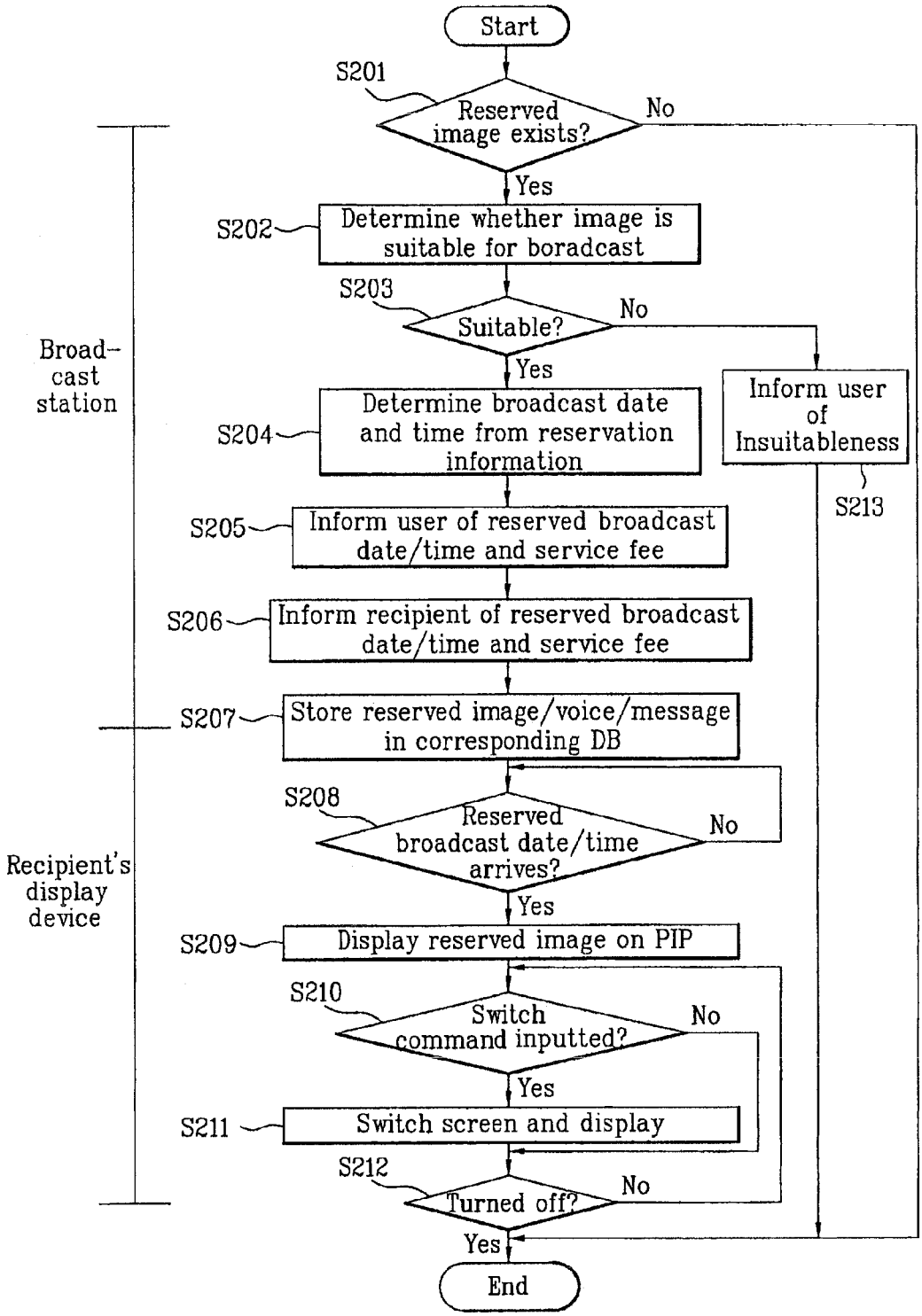
FIG. 4 is a flow diagram illustrating a reserved image-processing method according to an embodiment of the present invention.

FIG. 4 is a flow diagram illustrating a reserved image-processing method according to an embodiment of the present invention.

The reserved image-processing method will now be described in detail with reference to FIG. 4.

Referring to FIG. 4, the server 200 determines whether or not an image reserved by a user exists from the stored reservation request information (S201). The server 200 then determines whether or not the reserved image is suitable for the over-the-air broadcast (S202 and S203). For example, the server determines whether or not the reserved image or voice contains a lewd or violent content. For this determination, the server 200 may scan word data contained in the voice, or a broadcast station's staff may monitor the image and voice. If the reserved image is determined to be unsuitable for the over-the-air broadcast, the server 200 transmits to the uploading unit 100 a message for informing the unsuitableness of the image (S213).

If the reserved image is determined to be suitable for the over-the-air broadcast, the server 200 determines a broadcast date and time from the reservation request information corresponding to the reserved image (S204). The server 200 then transmits a message for informing the user of the determined (or reserved) broadcast date/time and a service fee to the uploading unit 100 or the user's mobile terminal or e-mail address (S205). Also, the server 200 transmits a message preannouncing the reservation transmission to the recipient 300's display device 400 or the recipient 300's mobile terminal or e-mail address (S206). Here, the message preannouncing the reservation transmission will be referred to as a preannouncing message. The preannouncing message includes the reserved broadcast date and time.

The server 200 stores the reserved image and voice in a DB corresponding to the reserved broadcast date and time (S207), and then transmits the stored image and voice to the display device 400 when the reserved broadcast date/time arrives (S208). If a stored message exists, the server 200 also transmits the stored message to the display device 400, together with the reserved image and voice.

If in a turned-on state, the display device 400 receives the reserved image and voice and then displays the received image and voice on its screen. At this time, the display device 400 displays the reserved and received image (hereinafter simply referred to as "the image") on its sub-screen (S209), such as a PIP (picture in picture) screen, or on its main screen according to set display options. During the display of the image, the display device 400 determines whether or not a display screen mode switch command (hereinafter simply referred to as "the mode switch command") is inputted thereto by the recipient (S210). If the mode switch command is inputted, the display device 400 displays the image on its sub-screen or main screen according to the mode switch command (S211). If the image is displayed while the recipient watches a broadcast program of a specific channel, a voice of the broadcast program is muted and the voice corresponding to the image is outputted.

If in a turned-off state, the display device 400 stores the received image and voice. Thereafter, when the recipient turns on the display device 400, the display device 400 displays on its screen a message for informing the recipient that the received image and voice has been stored therein.

The display device 400 generates a confirmation message for informing the server whether or not the recipient has watched the image, and then transmits the confirmation message to the server 200. For example, the display device 400 transmits to the server 200 a message for informing the server that the image has been displayed. Upon receipt of the confirmation message from the display device 400, the server 200 transmits the received confirmation message to the uploading unit 100.

As stated above, the system and method according to the present invention makes it possible to transmit a reserved image to a desired person on a broadcast wave and then display the resulting received image on the person's TV, and to transmit a reserved image to a predetermined recipient at a reserved date and time.

It will be apparent to those skilled in the art that various modifications and variations can be made in the present invention. Thus, it is intended that the present invention covers the modifications and variations of this invention provided they come within the scope of the appended claims and their equivalents.

What is claimed is:

[1. An image transmission system comprising:

an uploading unit for uploading an image and for inputting reservation request information for reserving transmission of the image to at least one display device of a predetermined recipient, the reservation request information comprising recipient information and a desired broadcast time selected by a user of the uploading unit; and a server for storing the reservation request information and the image, for transmitting the stored image to the at least one display device according to the reservation request information, and for determining a reserved broadcast time based on the desired broadcast time, wherein the server transmits the stored image to the at least one display device at the reserved broadcast time, the at least one display device of the predetermined recipient identified according to an ID or an IP address of the at least one display device included in the recipient information.]

[2. An image transmission method comprising:

inputting to a server reservation request information for reserving transmission of an image to at least one display device of a predetermined recipient, the reservation request information comprising recipient information and a desired broadcast time selected by a user of an uploading unit;

uploading the image to the server, the uploaded image to be stored in the server in association with the input reservation request information;

determining a reserved broadcast time based on the desired broadcast time; and transmitting the stored image from the server to the at least one display device according to the reservation request information, wherein the server transmits the stored image to the at least one display device at the reserved broadcast time, the at least one display device of the predetermined recipient identified according to an ID or an IP address of the at least one display device included in the recipient information.]

3. [An image] *A content* transmission system comprising:

*a server; and* an [uploading unit] *uploader* for uploading *a first content including at least one of* an image, [and for inputting] *a voice and a message with* reservation request information for [reserving transmission of the image to at least one display device of a predetermined recipient, the at least one display device of the predetermined recipient identified according to recipient information included in the reservation request information input by a user of said uploading unit; and a] *the first content to the server, wherein the* server [for storing the reservation request information and] *stores* the uploaded [image] *first content with the reservation request information,* and [for transmitting] *transmits a signal including a second content with* the stored [image] *first content* to [the at least one] *a* display device *at the same time, said first content being carried by the signal* according to the reservation request information, wherein *the reservation request information includes user information and recipient information, the user information comprising a phone number of a user of the uploader and* the recipient information [comprises an ID or an IP address of the at least one] *comprising a phone number of a recipient's* display device,

*wherein the server transmits information including a service fee and a result of transmission of the first content to the uploader based on the user information and transmits information including transmission time of the stored first content to the display device based on the recipient information,*

*wherein the second content is output via a main screen of the display device and the first content is automatically output via a sub-screen of the display device,*

*wherein a voice of the first content is muted during outputting via the sub-screen of the display device, and*

*wherein the display device stores the output first content when receiving a request for turned-off state on the display device, and then the display device displays a message for informing that the output first content has been stored when receiving a request for turned-on state on the display device.*

4. The [image] *content* transmission system of claim 3, wherein the [reservation request] *user* information *further* comprises [user information of] at least one of [the] *a* user's name, a user's address, [a user's phone number] *an identifier* (*ID*) *of the uploader, an Internet Protocol* (*IP*) *address* and a user's e-mail address.

5. The [image] *content* transmission system of claim 3, wherein the reservation request information comprises at least one of a type of the [image] *first content* and a display option.

6. The [image] *content* transmission system of claim 3, wherein the [uploading unit] *uploader* is connected to the server to input the reservation request information, wherein the server generates a user menu for display by the [uploading unit] *uploader*, the user menu for selecting the reservation request information[, and wherein the user registers the reservation request information with the server].

[7. The image transmission system of claim 3, wherein the server transmits a message preannouncing the reserved image transmission to the at least one display device.]

8. The [image] *content* transmission system of claim 3, wherein the [at least one] display device receives the transmitted [image] *first content*, determines whether the received [image] *first content* has been displayed by the [at least one] display device, and transmits to the server a confirmation message for informing the server whether the [image] *first content* has been displayed.

9. The [image] *content* transmission system of claim 3, wherein the reservation request information comprises a message *for the first content* to be displayed by the [at least one] display device together with the [image] *first content*.

10. The [image] *content* transmission system of claim 8, wherein the [at least one] display device receives the transmitted [image] *first content*, determines whether the received [image] *first content* has been displayed by the [at least one] display device, and stores the received [image] *first content* when it is determined that the [image] *first content* has not been displayed.

11. The [image] *content* transmission system of claim 8, wherein the server receives the confirmation message from the [at least one] display device and uploads the received confirmation message to the [uploading unit] *uploader*.

12. [An image] *A content* transmission method comprising*:*

[inputting to a server reservation request information for reserving transmission of an image to at least one display device of a predetermined recipient, the at least one display device of the predetermined recipient identified according to recipient information included in the reservation request information input to the server;]

uploading [the image to the server, the uploaded image to be stored in the server in association with the input reservation request information] *a first content including at least one of an image, a voice and a message with reservation request information for the first content from an uploader to a server*; and

*storing the uploaded first content with the reservation request information at the server; and* transmitting *a signal including a second content with* the stored [image] *first content* from the server to [the at least one] *a* display device *at the same time, said first content being carried by the signal* according to the reservation request information *at the server*, wherein *the reservation request information includes user information and recipient information, the user information comprising a phone number of a user of the uploader and* the recipient information [comprises an ID or an IP address] *comprising a phone number* of [the at least one] *a recipient's* display device,

*wherein the server transmits information including a service fee and a result of transmission of the first content to the uploader based on the user information and transmits information including transmission time of the stored first content to the display device based on the recipient information,*

*wherein the second content is output via a main screen of the display device and the first content is automatically output via a sub-screen of the display device, and*

*wherein a voice of the first content is muted during outputting via the sub-screen of the display device, and*

*wherein the display device stores the output first content when receiving a request for turned-off state on the display device, and then the display device displays a message for informing that the output first content has been stored when receiving a request for turned-on state on the display device.*

13. The [image] *content* transmission method of claim 12, wherein the [reservation request] *user* information *further* comprises [user information of] at least one of a user's name, a user's address, [a user's phone number] *an identifier* (*ID*) *of the uploader, an Internet Protocol* (*IP*) *address* and a user's e-mail address.

14. The [image] *content* transmission method of claim 12, wherein the reservation request information comprises at least one of a type of the [image] *first content* and a display option.

[15. The image transmission method of claim 12, further comprising transmitting a message preannouncing the reserved image transmission from the server to the at least one display device.]

16. The [image] *content* transmission method of claim 12, further comprising determining at [a broadcaster station] *the server,* whether the uploaded [image] *first content* is suitable for [broadcast] *transmitting* based on whether the [image] *first content* includes *a* content deemed by the [broadcaster station] *server* to be unsuitably lewd or violent.

17. The [image] *content* transmission method of claim 12, further comprising:

receiving the transmitted [image] *first and second content* at the [at least one] display device;

determining, at the [at least one] display device, whether the received [images] *first content* has been displayed by the [at least one] display device; and transmitting from the [at least one] display device to the server a confirmation message for informing the server whether the [image] *first content* has been displayed on the [at least one] display device.

18. The [image] *content* transmission method of claim 12, wherein the reservation request information comprises a message *for the first content* to be displayed by the [at least one] display device together with the [image] *first content*.

19. The [image] *content* transmission method of claim 12, further comprising:

receiving the transmitted [image] *first and second content* at the [at least one] display device;

determining, at the [at least one] display device, whether the received [images] *first content* has been displayed by the [at least one] display device; and storing the received [image] *first content* when it is determined that the [image] *first content* has not been displayed on the [at least one] display device.

20. The [image] *content* transmission method of claim 17, further comprising transmitting the confirmation message from the server to [an uploading unit] *the uploader* for performing said inputting of the reservation request information and the uploading of said [image] *first content*.

[21. The image transmission method of claim 12, wherein the reservation request information comprises a desired broadcast time selected by a user of an performing said inputting of the reservation request information and the uploading of said image.]

[22. The image transmission method of claim 21, further comprising determining a reserved broadcast time based on the desired broadcast time.]

[23. The image transmission method of claim 22, further comprising:

storing the uploaded image in a database in correspondence to the reserved broadcast time; and transmitting the stored image to the at least one display device at the reserved broadcast time.]

[24. The image transmission method of claim 22, further comprising transmitting from the server to the uploading unit a broadcast confirmation message for informing the user of the reserved broadcast time.]

[25. The image transmission method of claim 22, wherein the reservation request information further comprises user information including at least one of a user name, a user address, a user phone number, and a user e-mail address, and wherein the server transmits a broadcast confirmation message for informing the user of the reserved broadcast time and a service fee.]

[26. The image transmission method of claim 22, wherein the server transmits a preannouncing message preannouncing the image transmission to the at least one display device and wherein the preannouncing message includes the reserved broadcast time.]

27. The [image] *content* transmission method of claim [15] *12*, wherein recipient information *further* comprises [at least one of a telephone number and] an e-mail address of the predetermined recipient, and wherein the message preannouncing the [image] *content* transmission is also transmitted to the recipient using at least [of] one of the predetermined recipient's e-mail address and the predetermined recipient's telephone number.

28. The [image] *content* transmission method of claim 27, wherein the message preannouncing the [image] *content* transmission is transmitted to the predetermined recipient together with an indication of a service fee for receiving the image transmission.

29. The [image] *content* transmission method of claim 12, wherein the [at least one] display device includes a broadcast television receiver, wherein the server includes a broadcast station, and wherein the [image] *content* transmission is carried to the [at least one] display device over a broadcast television channel.

[30. The image transmission system of claim 3, wherein the reservation request information comprises a desired broadcast time selected by the user.]

[31. The image transmission system of claim 30, wherein the server determines a reserved broadcast time based on the desired broadcast time.]

[32. The image transmission system of claim 31, wherein the server stores the uploaded image in a database in correspondence to the reserved broadcast time and transmits the stored image to the at least one display device at the reserved broadcast time.]

[33. The image transmission system of claim 31, wherein the server transmits to the uploading unit a broadcast time confirmation message for informing the user of the reserved broadcast time.]

[34. The image transmission system of claim 31, wherein the reservation request information further comprises user information including at least one of a user name, a user address, a user phone number, and a user e-mail address, and wherein the server transmits a broadcast time confirmation message for informing the user of the reserved broadcast time and a service fee.]

[35. The image transmission system of claim 31, wherein the server transmits a preannouncing message preannouncing the image transmission to the at least one display device, and wherein the preannouncing message includes the reserved broadcast time.]

36. The [image] *content* transmission system of [claim 7] *claim 3*, wherein the recipient information *further* comprises [at least one of a telephone number and] an e-mail address of the predetermined recipient and wherein the preannouncing message preannouncing the [image] *content* transmission is also transmitted to the predetermined recipient using at least of one of the predetermined recipient's e-mail address and the predetermined recipient's telephone number.

[37. The image transmission system of claim 36, wherein the preannouncing message preannouncing the image transmission is transmitted to the predetermined recipient together with an indication of a service fee for receiving the image transmission.]

38. The [image] *content* transmission system of claim 3, wherein the [at least one] display device includes a broadcast television receiver, wherein the server includes a broadcast station, and wherein the [image] *content* transmission is carried to the [at least one] display device over a broadcast television channel.

* * * * *